S. B. WASSON.
RUBBING POST.
APPLICATION FILED MAR. 19, 1909.
936,687.
Patented Oct. 12, 1909.
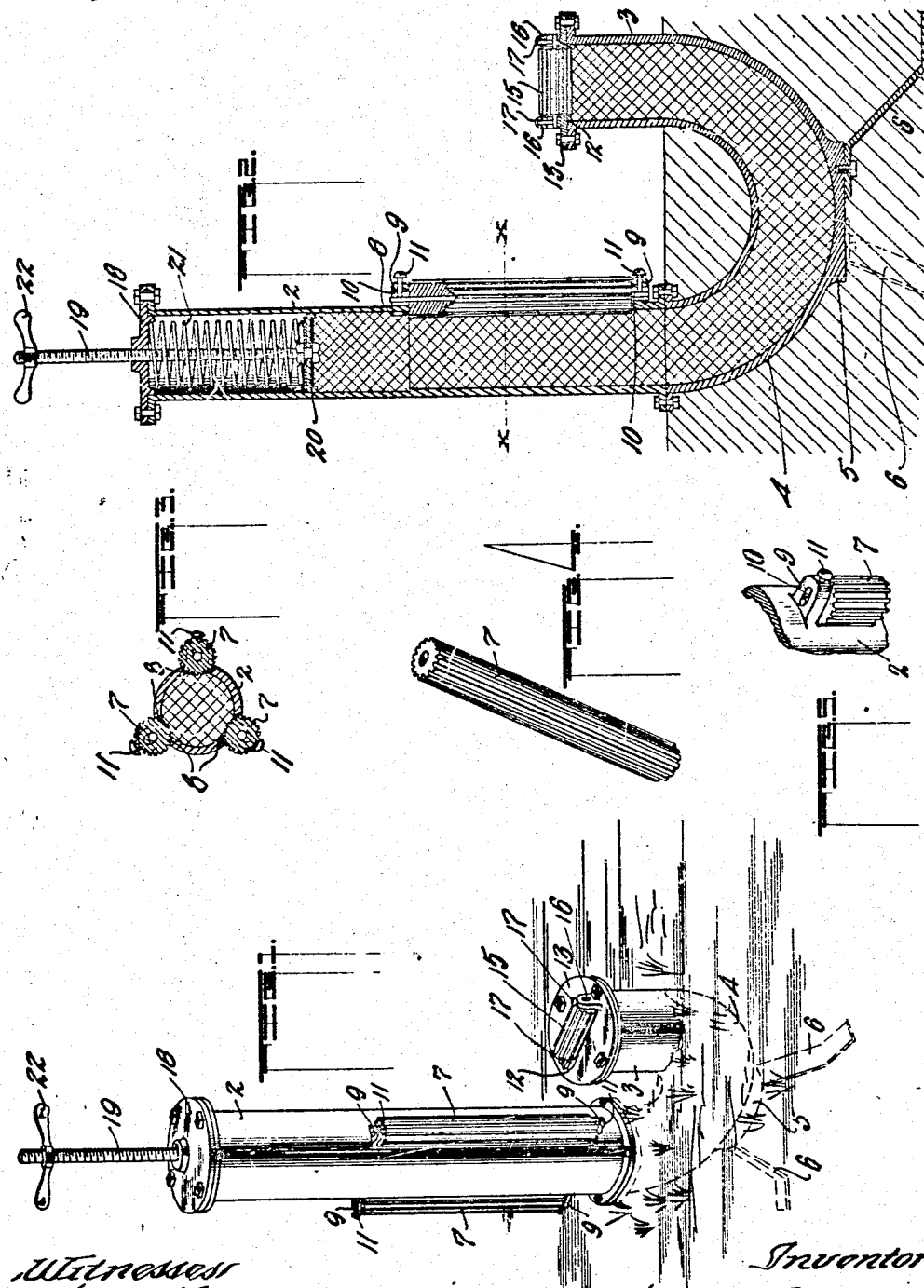

UNITED STATES PATENT OFFICE.

SAMUEL B. WASSON, OF PEORIA, ILLINOIS.

RUBBING-POST.

936,687.

Specification of Letters Patent.

Patented Oct. 12, 1909.

Application filed March 19, 1909. Serial No. 484,429.

*To all whom it may concern:*

Be it known that I, SAMUEL B. WASSON, a citizen of the United States, residing at Peoria, in the county of Peoria and State of Illinois, have invented certain new and useful Improvements in Rubbing-Posts, of which the following is a specification.

This invention relates to a rubbing post adapted to distribute insecticides and disinfectants to the body of swine and other affected animals.

The object of the invention is to provide a self feeding device that may be constructed cheaply and that will be effective and efficient in operation.

It has generally been the custom to dip swine and other animals in oil to rid them of parasites which are common to swine and other animals but crude oil, which has been the liquid preferred for the purpose, is hard to get, and furthermore is quite expensive as the swine, particularly, need to be dipped quite frequently to keep them free from parasites and this necessitates the handling of the animals, which is rather a troublesome matter.

In carrying out my invention, I have designed to use an oily substance of substantially the consistency of axle grease, as such a substance serves the purpose better and furthermore is very much cheaper.

My invention comprises means supported in a position where swine or other animals may rub up against it and also means that they can straddle and get over in such position as to scratch the under part of the body, this latter feature being very essential as vermin are most likely to collect upon the under portions of the body that are not reached by scratching upon a vertically positioned post.

That my invention may be more fully understood, reference is had to the accompanying drawings, in which—

Figure 1 is a perspective view showing my device assembled and positioned for service; Fig. 2 is a vertical sectional view of the device; Fig. 3 is a horizontal section on the line x—x of Fig. 2, assuming that the complete structure was present in such figure; Fig. 4 is a detail view showing a corrugated roll; and Fig. 5 is a detail view showing the manner of supporting the corrugated rolls shown in Fig. 4, in an adjustable position.

Referring more particularly to the drawings, 2 refers to a vertically disposed hollow section of the rubbing post.

3 refers to a hollow section of the rubbing post, the same being considerably shorter than section 2.

4 is a hollow curved connecting portion that is integrally connected with section 3 and detachably connected with section 2 in the manner shown in the drawings, in which it appears that flanges are provided on the sections 2 and 4, which are adapted to be bolted together. The lower portion of the curved section 4 is provided with an integral projecting portion 5 having a flat face, and 6 are supporting legs adapted to maintain the post in a vertical position.

7 are corrugated rolls adapted to be seated in slots as 8 within the wall of the vertical section 2, said rollers being journaled in boxings 9—9, the same being slotted as at 10 to permit the journals of said rollers to be moved backwardly and forwardly therein.

11—11 are set screws supported in threaded openings in the boxings 9—9 and bearing against the journals of the rollers and are provided to adjust said rollers back and forth so that at times they may bear at differing distances within the slotted openings in the post. This adjustability is provided to meet the varying conditions of consistency of the hard oily substance as it is affected by heat and cold. In cold weather, the grease substance being harder, it will be unnecessary to seat the rollers so deep within the openings, while in warm weather, when the grease is not so hard, it will be necessary to seat them deeper to provide a more complete closure.

12 is a slot within the cap 13 secured upon the upper end of the section 3 of the post 5 while 15 is a roller adapted to be seated therein. 16—16 are slotted journal bearings within the said cap adapted to support the journals of said roller.

17—17 are set screws adapted to operate in connection with the roller journals in the same manner and for the same purpose as previously described in connection with the rollers in section 2.

13 is a cap provided with a central perforation and adapted to be detachably connected with the upper end of section 2 of the post.

19 is a threaded piston rod.

20 is a piston head comprising the usual disk closure portions and a gasket, the complete piston head being adapted to provide a complete closure and a perfect fit within the opening of section 2 of the post.

21 is a coil spring adapted to be interposed between the piston head and cap 18.

22 is a hand nut adapted to be carried upon the piston 19.

In applying the device practically, the post is adapted to be filled with a hard greasy substance, filling the complete inclosed space except the upper portion of the section 2 and it is designed that pressure shall be applied to the grease in order to keep it always in a compact body so that it will always bear against the corrugated rollers so that as they are turned, they will carry with them the greasy substance, to a point without the post so that as the animal rubs upon the rolls, grease will be applied to its body. In applying the piston, after the post has been properly filled with the hard greasy substance, the hand nut 22 is turned down upon the piston rod 19 and as it contacts with plate 18 and the nut continues to be turned, the spring will be compressed between the head 20 and the plate 18 and when it has been sufficiently compressed to allow its insertion within the section 2 of the post so that the piston will bear upon the upper surface of the grease and the cap 18 will be in position to be secured to the top of said post, then the hand nut is turned back into substantially the position shown in Fig. 1, in which position it will be seen that considerable latitude of movement will be provided for the piston so that as the quantity of grease within the post diminishes and the body of grease is forced downwardly, within the post, the piston head will follow downwardly under the pressure of the spring, thus continuing the pressure upon the grease for a considerable distance and until its limit of movement has been reached; then it is designed in practice that the post shall again be filled up to a point where spring pressure may be applied with the proper force to effectually compress the grease within the interior of the post.

In practice, it has been found that swine and other animals affected with vermin are disposed to scratch upon any obstacle that may be convenient and therefore the vertical portion 2 provides a rubbing section which they may use for the purpose, and the shorter section is provided for the same purpose except that in providing the device with a short vertically bearing section, a place is provided that they may stand over and scratch the under portions of their bodies, and as this part is the most apt to be affected by the vermin, it is essential that means be provided that will enable them to rub those portions, and therefore my device provides every facility for effectually and conveniently applying the oil contained within the post to the body of the animal.

Obviously, my invention may be constructed in different forms and the parts may be differently arranged, and in fact, many modifications and changes may be made therein without departing from the spirit of my invention and I therefore claim all forms of embodiment of the device within the general principle involved in the same.

Having thus fully described my invention, what I claim and desire to secure by Letters Patent is:—

1. A rubbing post for live stock consisting of a hollow body adapted to be supported vertically in the ground and provided with a series of elongated apertures therein, a series of rolls pivotally supported in said apertures, a portion thereof adapted to protrude within the hollow body and engage the body of hard oil contained therein.

2. A rubbing post for live stock consisting of a hollow body adapted to contain a hard greasy substance, and comprsing two vertically disposed portions, one of considerable length provided with a series of apertures therein and one considerably shorter provided with an aperture in the upper end thereof, said sections suitably connected together and adapted to be set in the ground in vertical positions so that both upright portions will bear above the surface, a series of rollers supported within said apertures in the longer portion in a manner to permit the turning of the same by contact, and a roller journaled within said aperture in the shorter section.

3. A rubbing post for live stock consisting of a hollow body adapted to contain a hard greasy substance, and comprising two vertically disposed portions, one of considerable length provided with a series of apertures therein and one considerably shorter provided with an aperture in the upper end thereof, said sections suitably connected together and adapted to be set in the ground in vertical positions so that both upright portions will bear above the surface, a series of rollers supported within said apertures in the longer portion in a manner to permit the turning of the same by contact, a roller journaled within said aperture in the shorter post, and means for holding the hard greasy substance under compression to cause it to be contained in a compact mass and to move the mass lengthwise of the post.

4. In a device of the class described, a hollow body comprising two vertically disposed portions each provided with apertures therein, rolls rotatably supported in said apertures, a connecting hollow section between said vertically disposed sections, said hollow body being adapted to contain a greasy substance, and means supported in one of said vertically disposed sections adapted to hold the greasy substance under compression and for moving it lengthwise of the hollow body.

5. A rubbing post for live stock consisting of a hollow body adapted to contain a greasy substance, comprising two vertically disposed portions, one of considerable height, and one considerably shorter, each section apertured and supporting a roll in each of said apertures in a manner to permit the same to be turned by exterior contact, a section connecting the long and short portions of the post and means for holding the grease under compression and for moving it lengthwise of the post.

6. A rubbing post for live stock, comprising a hollow body adapted to contain a greasy substance, comprising two vertically disposed portions, one of considerable height and provided with apertures therein, and one considerably shorter provided with an aperture therein, a hollow section for connecting said long and short portions of the post, and means for holding the grease under compression and for moving it lengthwise of the post.

7. A rubbing post for live stock, consisting of a hollow body adapted to contain a greasy substance comprising two vertically disposed portions, one of considerable height and provided with apertures therein and one considerably shorter and provided with an aperture in the upper end thereof, a section connecting said long and short sections of the post, a series of rollers supported within the apertures in the longer section in a manner to permit the turning of the same by contact, a roller supported in the aperture of the shorter post in a manner to permit it to be turned by contact and means for holding the grease under compression and for moving it lengthwise of the post.

In testimony whereof I have affixed my signature in presence of two witnesses.

SAMUEL B. WASSON.

Witnesses:
 DOUGLAS WILSON,
 W. V. TEFFT.